May 2, 1961 A. S. FITZ GERALD 2,982,406
DRILL SORTER
Filed April 28, 1958 4 Sheets-Sheet 1

FIG 1

INVENTOR.
Alan S. Fitz Gerald

May 2, 1961 A. S. FITZ GERALD 2,982,406
DRILL SORTER

Filed April 28, 1958 4 Sheets-Sheet 2

INVENTOR.
Alan S. FitzGerald

May 2, 1961  A. S. FITZ GERALD  2,982,406
DRILL SORTER

Filed April 28, 1958  4 Sheets-Sheet 3

INVENTOR.
Alan S. Fitz Gerald

May 2, 1961 A. S. FITZ GERALD 2,982,406
DRILL SORTER

Filed April 28, 1958 4 Sheets-Sheet 4

Fig 4

INVENTOR.
Alan S. FitzGerald

United States Patent Office 2,982,406
Patented May 2, 1961

---

2,982,406

DRILL SORTER

Alan S. FitzGerald, 333 Corte Madera Ave., Mill Valley, Calif.

Filed Apr. 28, 1958, Ser. No. 731,177

16 Claims. (Cl. 209—90)

This invention relates to improvements in drill sorters.

The principal object of my invention is to provide a device which will automatically sort drills of various sizes, and then deposit them in slots in a conveniently positioned storage rack, from which they may be identifiably dispensed when required.

The present application is a continuation-in-part of my co-pending application, Serial Number 551,393, filed December 6, 1955.

The arrangements which are described in the prior application, above referred to, comprise certain features relating to structure for the sorting of drills which are broadly claimed in that application. These features include an aperture decreasing in width from one end thereof to the other, and arrangements for introducing a drill into this aperture and then causing the drill to move along the aperture until it is stopped by reason of the distance between the surfaces of the aperture becoming less than the diameter of the drill, at which point the drill is caused to be ejected from the aperture into its designated slot in the storage rack.

A particular feature of the invention disclosed in my present application, wherein it differs from the arrangements of my co-pending case, relates to the method by means of which the drill is ejected from the aperture, when its movement has been so arrested. The structure for receiving the drill, and for transporting it to the proper releasing position, is similar to that disclosed in my co-pending application.

In the arrangement described in the prior application the convergence of the surfaces of the aperture took the form of a series of finite decrements or steps. I have found that a conformation of this character provides the highest degree of selectivity; that is to say, it will distinguish between drills differing in diameter by a minimal dimension.

The structure of my co-pending application is therefore specially appropriate for a precision device, suitable for use by toolmakers and other skilled persons accustomed to maintain their drills in good condition. Drills which are bent, scored by movement in the chuck, or otherwise damaged, do not permit the highest degree of selectivity of which the type of drill sorter of my copending application is capable, when it is employed for sorting drills which are kept in an undamaged condition.

Furthermore, it will be clear to those skilled in the art that the use of a stepped aperture pertains especially to sets of drills of predetermined denominations; such as, for example, the sets of drills which are known as the fraction series, which are graduated in sixty-fourths of an inch; or the metric series; or the so-called number series, which comprise an arbitrary succession of diameters designated by number. The structure of the drill sorter of my above identified application would essentially comprise a series of steps in the aperture compatible with the particular set of drills for which the device is intended to be used.

However, when there is presented to a drill sorter of the type disclosed in my prior application, a drill which is foreign to the denomination for which the device is intended, such that the diameter of the drill is intermediate between the dimensions of two adjacent steps in the aperture, or a drill so damaged as to be unacceptable, a stoppage may result. That is to say, the drill may fail to release and must be removed by hand.

It is therefore an object of my present invention to provide a variant type of the device disclosed and claimed in my above identified co-pending application, which is not restricted to specific sets or denominations of drills, but which will effectively sort drills or other magnetically susceptible cylindrical objects of random size into groups embracing predetermined ranges of diameter.

It is a further object of my present invention to provide a drill sorter capable of sorting drills which are bent, scored, or otherwise damaged, without a stoppage, with such a degree of precision as the condition of the drills may permit.

My present application, in addition, discloses substantially more simple arrangements for the digital withdrawal of the drills from the storage slots, and improved and more economical principles of construction in general.

These and other novel features which I believe to be characteristic of my invention will be set forth with particularity in the appended claims. My invention itself, however, both as to its organization and method of operation, together with further objects and advantages thereof, may best be understood in reference to the following description taken in connection with the accompanying drawings, in which:

Figure 1:
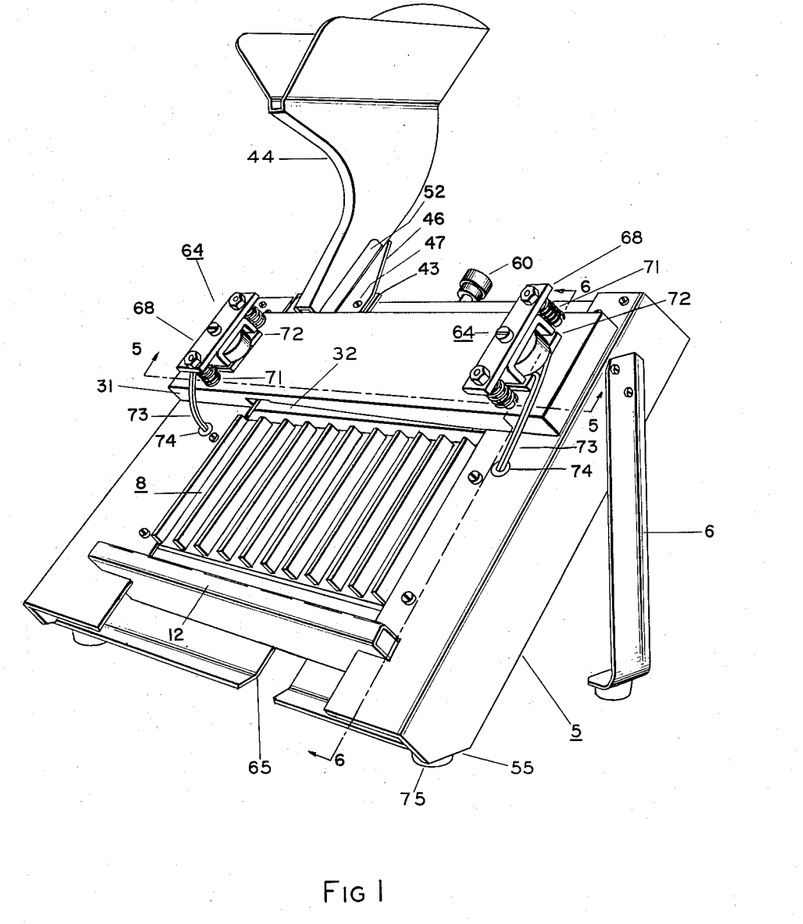
Fig. 1 is a perspective view of a drill sorter according to my invention, viewed from the front.

Referring to the drawings, I show in Fig. 1 a substantially hollow base member 5 which is normally held in an inclined position by a pair of legs 6 and 7, of which 6 is visible in Fig. 1. The base member 5 serves to support and to contain the motor and other electrical components as will be hereinafter described.

Mounted on the base member 5 is a drill storage rack 8 which is provided with a plurality of upstanding partitions or septa which divide the rack into separate compartments or slots for receiving the drills.

Also mounted upon the base 5 is a gauge-plate 31 which has a tapered recess formed in its lower surface. This recess, it is to be particularly noted, is distinguished from the corresponding element in my above cited co-pending application, in that there are no steps formed therein; the recess is continuously tapered.

Mounted at the rear of the gauge-plate 31, and towards the left hand extremity thereof, is a hopper 44 which consists of a funnel shaped member for receiving a drill to be sorted and for directing its passage into the gauging and sorting mechanism of my invention.

Figure 2:
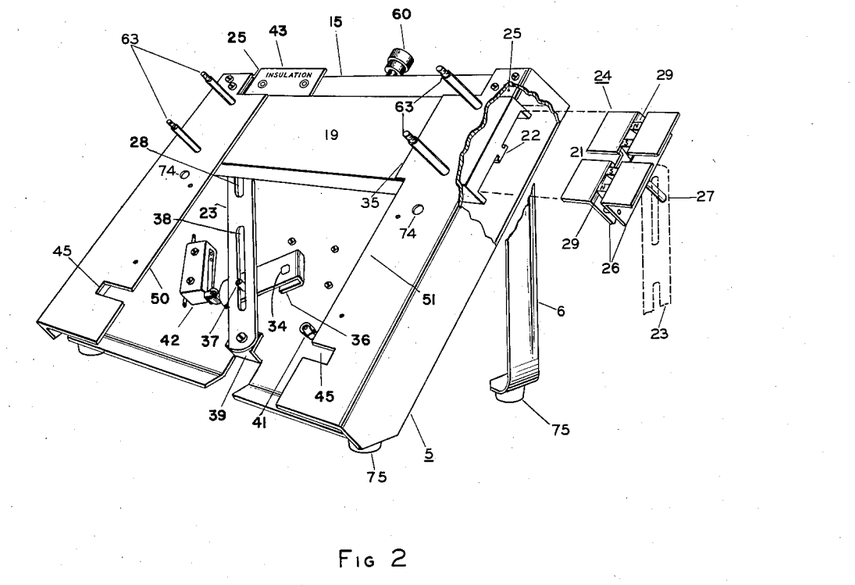
Fig. 2 is a perspective view of my invention from an aspect similar to that of Fig. 1, but in which certain components are removed in order to show other parts.

I show in Fig. 2 a view of the hollow base member 5 with the rack 8, the gauge-plate 31, and the hopper 44 removed therefrom in order to disclose other operating elements of my invention. As may be seen in Fig. 2 the base 5 consists of a single sheet of suitable material, such as metal, folded to form side walls which are again inwardly folded along their upper edges to form lateral flanges 50 and 51.

The lower ends of the base 5 may have the corners chamfered as shown at 55 in Fig. 1, and the bottom of the lower panel may be sheared and folded through an angle conformable with the angle of inclination of the device, so as to provide a horizontal surface for the attachment of rubber feet as shown in Fig. 2 at 75. Similar rubber feet may be provided on the bottom of the legs 6 and 7 as shown at 75 also in Figs. 2 and 6.

Figure 5:
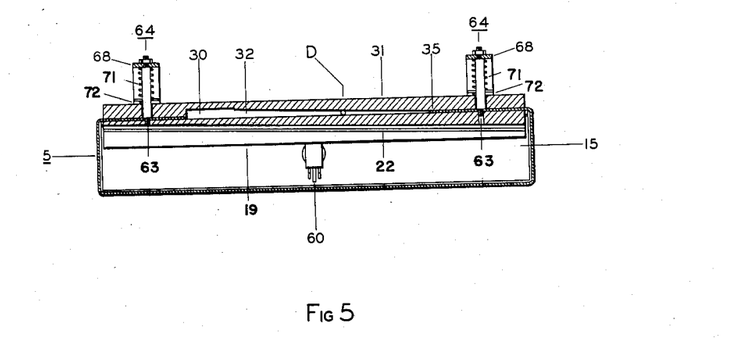
Fig. 5 is a cross-sectional view taken along the line 5—5 in Fig. 1.

I show also in Fig. 2 a channel shaped member 19, made of non-magnetic material, and having a plane upper surface, which is attached to the under surfaces of the lateral flanges 50 and 51. The gauge-plate 31 is carried upon the upper surfaces of the flanges 50, 51, so as to form an aperture 32, as seen in Figs. 1 and 5, between the upper plane surface of 19 and the lower recessed surface of 31. The width of the aperture 32 at its wider end is made somewhat greater than the diameter of the largest drill which the drill sorter is designed to accommodate, so as to form an entrance or portal 30, as seen in Fig. 5, into which the drill is directed, endwise, by the hopper 44.

Figures 3, 6:
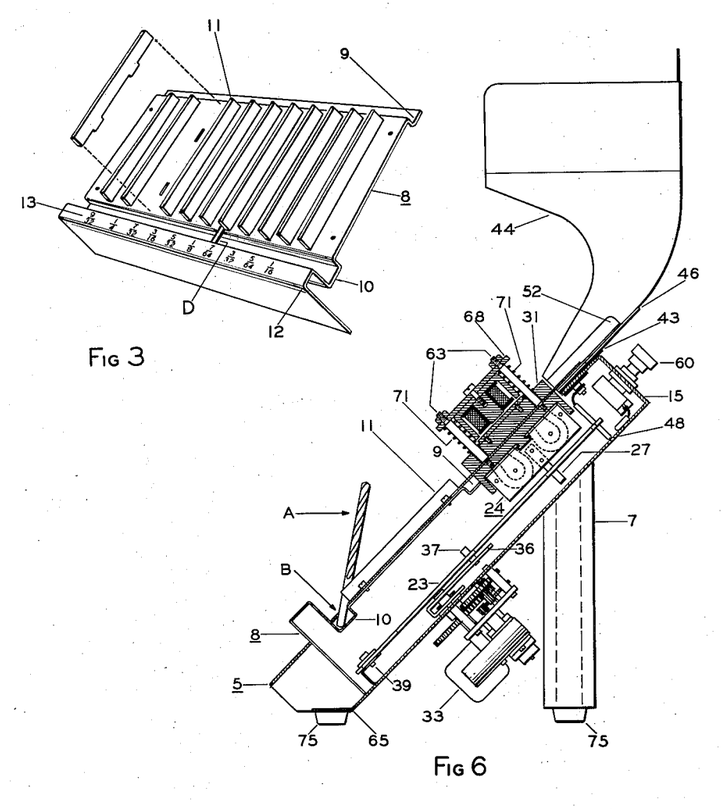
Fig. 3 is a perspective view of the storage rack separated from the other components.
Fig. 6 is a cross-sectional view taken along the line 6—6 in Fig. 1.

Fig. 3 shows the method of construction of the rack 8, which may be seen to be fabricated from a sheet of suitable material folded to the conformation shown, and having the septa 11 mounted therein by any suitable means of attachment, as by spot-welding, or by the tongue and slot type of assembly illustrated in Fig. 3.

Referring again to Fig. 2, it is to be understood that the intent of this figure is primarily to present the basic principles of the mechanical structure and operation of my invention. Accordingly not all of the purely electrical components are shown in Fig. 2, since it will be understood by those skilled in the art that in such a device the exact physical locations of the various electrical elements are not necessarily of material significance. Such parts may be placed anywhere within or upon the base 5 at which they may conveniently be accommodated. The operation of the electrical components of the drill sorter are better presented and described in reference to the electrical diagram of connections shown in Fig. 4.

My present invention is further differentiated from that of my prior application by the fact that the gauge-plate 31 is not rigidly attached to the channel-shaped member 19. The gauge-plate is held in position adjacent 19 by means of springs. Electromagnets are provided by means of which the gauge-plate 31 may be lifted through a short distance so as to cause a momentary increase in the space, separating 19 and 31.

As shown in Figs. 2 and 5 the channel-shaped member 19 is rigidly secured to the undersides of the flanges 50 and 51 by two pairs of studs 63 which are provided with shoulders at their lower extremities for this purpose. The gauge-plate 31 is furnished with four holes slidably registering with the four studs 63. These four studs are also provided with shoulders at the upper ends thereof to provide for the mounting of two cross-plates 68 as shown in Fig. 1.

Surrounding the four studs are four compression springs 71 bearing at their upper ends against the cross-plates 68, and applying pressure to the gauge-plate 31 so as to close the latter firmly upon the lateral flanges 50 and 51 which thus separate 19 and 31.

I show in Fig. 5 a cross-sectional view through a plane as indicated at 5—5 in Fig. 1. The view in Fig. 5 is shown as being taken in a sense parallel to the major surfaces of the base member 5; thus at an angle to the front-to-rear horizontal plane and corresponding to the inclined position of 5. The section depicted is that which passes through the center lines of the two studs 63 shown, respectively, at lower left and at lower right, in Fig. 2. The primary purpose of this figure is to bring out more clearly the conformation of the base member 5, and the attachment thereto of the channel shaped member 19 and the gauge-plate 31. Accordingly these parts are shown assembled without some of the other working parts which do not materially contribute to this result.

I show another cross-sectional view of my invention in Fig. 6. This is a vertical section viewed as from the right with the base 5 in its normal attitude to the horizontal. The plane of this section is indicated at 6—6 in Fig. 1. and is that which passes through the center lines of the two studs 63, respectively, which are shown at upper right, and at lower right, in Fig. 2.

As may be seen in Figs. 1, 5, and 6 the two cross-plates 68 carry at 64, two electromagnets, which have conventional yokes, cores, and coils, and are adapted to exert, when energized, a tractive force upon two armatures 72, which are secured to the upper surface of the gauge-plate 31, beneath the pole-faces of the electromagnets 64, by the screws shown in Fig. 6. Thus when the electromagnets 64 are de-energized the gauge-plate 31 is held in pressure contact with the flanges 50 and 51 by the springs 71. Under this condition the aperture 32, between 19 and 31, as best seen in Fig. 5, has a dimension at the left hand extremity equal to the depth of the recess in 31 plus the thickness of the flange 50; which latter is the same as that of the material used to fabricate the base member 5. At the right hand end of the aperture 32 the dimension of the latter is exactly equal to the thickness of the aforesaid material.

When, however, the electromagnets 64 are energized, the tractive force exerted upon the armatures 72 causes the gauge-plate 31 to be raised, against the pressure of the springs 71, by an amount equal to the previous air-gap between the pole-faces of the electromagnets 64 and the armatures 72. This lift need not exceed a few thousandths of an inch.

Referring again to Fig. 2, there is formed upon, or attached to, the lower surface of the channel shaped member 19, a central portion 22 having a cross-section in the shape of an inverted T and which comprises a longitudinal guide or supporting track. As also seen in Fig. 5 it will be noted that the track 22 slants downwardly from one end to the opposite extremity, for the purpose described and explained in my co-pending application Serial Number 551,393.

The track 22 supports and retains a carriage 24 adapted to slide back and forth along the under surface of the channel-shaped member 19. The carriage 24 comprises a pair of similar plates 26, each having a T-shaped slot 21 punched out of one edge, and being then folded at right angles along the line of the lower edge of the horizontal portion of the T of the T-shaped slot. These two angle-plates 26 are secured back-to-back by means of rivets or other suitable means so as to retain therebetween a pair of U-shaped permanent magnets 29 as shown in Figs. 2 and 6. The magnets 29 have their like poles adjacent each other and their pole faces contiguous with the lower surface of the channel-shaped member 19, so as to cause the drill to be magnetically held against the upper plane surface of 19, and so that the drill may be caused to travel laterally along the latter in accordance with any movement which may be imparted to the carriage 24.

In Fig. 2 the side wall of the base member 5 is shown as partially cut away in order better to indicate the shape of the channel shaped member 19 and the track 22. Likewise the carriage 24 is depicted as if withdrawn through this opening.

In order to impart a reciprocating motion to the carriage 24, I provide an electric motor, shown at 33 in Fig. 6, which is mounted on the rear, or lower surface of the base 5 and which, through the reduction gearing illustrated, drives a shaft 34, seen in Fig. 2, projecting through the lower panel of 5 and having affixed thereto, above the surface of the said lower panel of 5, a crank-arm 36 which may be conveniently formed by folding a strip of metal to the configuration shown in the drawings. As seen in Fig. 2, the crank-arm 36 has an upstanding crank-pin 37 sliding in the slot 38 of a lever 23, which latter is pivoted at 39 to a suitably formed portion of the base member 5.

As shown in Fig. 2, a circuit-closing limit-switch 41, and a circuit-opening limit-switch 42, which may conveniently comprise so-called micro-switches, are mounted on the upper surface of the lower panel of 5 so that the operative members of these switches lie in the path of the extremity of the crank-arm 36 so as to be engaged by the said extremity as the crank-arm is rotated by the shaft 34.

Referring to Figs. 2 and 6, it will be observed that the carriage 24 is provided with a downwardly extending pin 27 which engages with a second slot 28 in the lever 23. The pin may be formed so as to have a rectangular shank whereby it may be assembled between the two plates 26. While these plates 26 are shown as being of a simple rectangular configuration in order to simplify the drawings, it will be obvious to those skilled in the art that for facility of production and assembly they may be provided with suitable tongue cuts or press-work cavities for registering and retaining the permanent magnets 29 and the shank of the pin 27.

The lower end of the base 5 may be left open, but the upper end is closed either completely or in part, as may be convenient, by an angle-member 15. The function of this angle-member is, primarily, to carry the hopper 44. Thus 15 is secured at both of its ends to the undersides of the lateral flanges 50 and 51 by any suitable means as by the screws shown in the drawings. Spacers 25 are included between the flanges 50, 51 and the angle-member 15, so as to provide that the upper surface of 15 is below the lower surfaces of 50 and 51 by a predetermined dimension.

Figure 4:
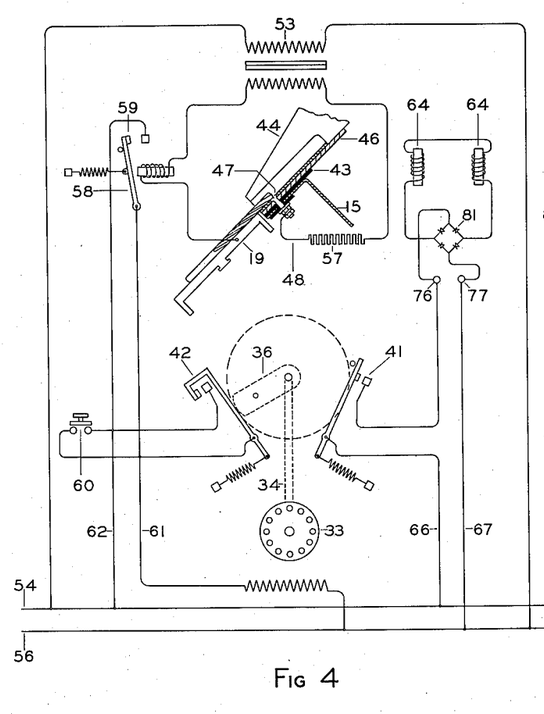
Fig. 4 is a circuit diagram of the electrical connections.

The hopper 44 consists of a specially shaped funnel like member formed of any suitable non-magnetic conducting material such as non-ferrous sheet metal. For greater strength and rigidity of mounting, the hopper 44 may be provided with a mounting-plate 46 of trapezoidal shape and of somewhat thicker material, to which it may be attached by welding or any other suitable means. The hopper 44 is mounted upon the angle-member 15 at a point thereon adjacent the portal 30 of the aperture 32. The hopper 44 is secured to the angle-member 15, with the interposition of insulating means 43, by means of two screws 47 passing through the mounting plate 46. One of the screws 47 is visible in Figs. 1, 4, and 6. At least one of the screws 47 is electrically connected to the metal of the hopper 44 but is insulated from the angle-member 15, and is of sufficient length to receive an electrical connection 48 as shown in Figs. 4 and 6. It is for this reason, that is to say, because of the presence of the insulation 43, that the spacers 25 are included. The thickness of the spacers 25 should be precisely equal to the thickness of the insulation 43, separating 15 and 46, plus the combined thickness of 46 and that of the lower wall of the hopper 44 adjacent to 30. This provides that the upper surface of the lower wall of 44 is in exact alignment with the upper surface of 19, so that smooth passage of the drill from the former to the latter is assured.

In Fig. 2 the mechanism is shown in its quiescent position. That is to say, tthe crank-arm 36 is in engagement with the circuit-opening limit-switch 42, the effect of which is apparent from the electric circuit diagram of Fig. 4. Referring thereto it will be seen that the motor 33 is connected by means of conductors 61, 62, in series with the circuit-opening switch 42 to be energized from a source of electrical energy shown as conductors 54 and 56. In Fig. 4 the quiescent position is likewise depicted; accordingly the limit-switch 42 is held open by the crank-arm 36, so that the motor, under these conditions, is not energized.

A momentary contact switch, or circuit-closing push button, which may be mounted at any conveniently accessible location on the drill sorter, as shown in the several figures at 60, is connected in parallel with the open contacts of 42.

It will be apparent that if the push-button 60 be momentarily depressed, the motor will commence to rotate, whereupon 36 will immediately disengage from the circuit-opening limit-switch 42. As result, though 60 be now released, operation of the motor 33 will continue, since 42 is now closed. Thus the shaft 34 and the crank arm 36 will make one complete revolution until the crank arm 36 returns to the position illustrated in Figs. 2 and 4, again engaging with 42 and thereby coming to rest. In the course of this action, as the crank-arm 36 passes by the circuit-closing limit-switch 41, the contacts of the latter will momentarily be closed; the function of this will be hereinafter set forth.

To operate the drill sorter manually all that is necessary is that the drill be delivered to the hopper 44 and that the push-button 60 be thereafter momentarily depressed. The drill travels down the hopper 44 and under the influence of gravity, slides out of the neck of 44 and into the portal 30 between 19 and 31.

At this point the drill is, as it were, seized by the permanent magnets 29. That is to say, its gravitational downward movement is arrested, by the action of the magnets, which, in the quiescent position, are directly below the portal 30. The drill is now in the position shown in Fig. 4, the lower portion resting in contact with 19 and the upper portion lying upon the lower surface of the throat of the hopper 44.

When the push-button 60 is now operated the motor 33 will commence to rotate causing one complete revolution of 36 after which the motor will be stopped by 42 and the quiescent position of Figs. 2 and 4 re-established. This will cause the carriage 24 to make one complete excursion along 19 to the extremity of its travel, in accordance with the radius of the position of the crank-pin 37 and the several dimensions pertaining to the lever 23, and return to its quiescent position below the portal 30. The drill, therefore, due to the tractive force of the permanent magnets 29, will be caused to travel in a lateral sense, with respect to the longitudinal dimension of the drill, along the aperture 32; that is to say in the space between 19 and 31. When it reaches a position in the aperture 32 at which the dimension of the space between 19 and 31 is no longer greater than the diameter of the drill, the latter will be unable further to follow the movement of the carriage 24, and the drill will become wedged between the upper surface of 19 and the lower surface of the recess in 31, at a position which will be in line with its designated slot in the rack 8.

When, as in the present invention, the aperture 32 is of the smoothly tapered form, that is to say, it is not of the stepped type disclosed in my prior application Serial Number 551,393, the drill will not readily be dislodged by such means as the impact or agitating device described in the above cited application.

According to my present invention, therefore, I substitute, for the agitating device of my prior application, the two electromagnets 64, which, simultaneously, as by connection in series, are energized, in the same manner, by the same means, and at the same instant in the operating cycle of the drill sorter, as the agitating device of my above cited co-pending application, which was therein identified likewise by the numeral 64.

That is to say, as shown in Fig. 4 of the present application, the electromagnets 64 are momentarily energized when the circuit-closing limit-switch 41 is engaged by the extremity of the crank-arm 36, when the carriage 24 is in the vicinity of the completion of its excursion towards the right hand end of 19. Connections for so energizing the electromagnets 64 are seen, in Fig. 1 at 73, passing, with suitable insulation, through holes 74 provided for this purpose in the lateral flanges 50 and 51 of the base member 5.

When the limit-switch 41 is actuated by the crank-arm 36, the two electromagnets 64 attract the two armatures 72 and lift the gauge-plate 31. This causes a small increment in the space between the upper surface of 19 and the lower surface of the recess in 31, and the wedged drill is instantly released and slides, under the influence of gravity, into its designated slot in the rack 8.

As may clearly be seen in Figs. 1 and 6, the hopper 44 is given a characteristic configuration conformable with its special function which arises from the following considerations.

Consistent with the type of service which my invention is designed to furnish, it is not desirable that any special attention be necessary when a drill is to be manually delivered to the drill sorter for return to its proper position in the rack 8, but, rather, that the device function effectively when the drill is merely dropped into the hopper 44 in somewhat of a casual manner. It is, however, to be noted that it is preferable that the drill be thrown into the hopper shank first in order to avoid needless wear upon the cutting edge of the drill and the guiding surfaces of the hopper; however the device will function correctly should a drill occasionally be inadvertently delivered point first.

The function of the hopper 44 is to deliver the drill into the portal 30 with a direction of motion parallel to the axis of the drill, endwise, that is, which is approximately at right angles to the length of 19 and 31, and in exact alignment with the upper plane surface of 19.

Since the user of the drill may be assumed to be normally in front of the drill sorter, the hopper 44 is, in the first place provided with a flared outer portion comprising two convergent inclined plane surfaces which receive the drill, delivered manually in a substantially random attitude, from the front of the drill sorter, and align it so that its axis is placed at right angles to the length of 19 and 31.

However, it is to be noted that the drill is to enter 30 from the rear though it is delivered to the hopper from the front. Accordingly, in a sense which is parallel to the length of the drill, it is necessary that the latter be guided and directed so as to provide for a substantial angular change in the direction of motion. Thus the internal dimensions and configuration of the curved throat portion of the hopper 44, in a back-to-front direction, must be such as to permit a turning movement of the order of ninety degrees, of the longest drill which the device is designed to accommodate.

On the other hand it is desirable that the dimension of the throat portion of 44, in the left-to-right direction be uniformly minimal throughout. This is for the following reason. It is necessary to provide an opening, seen at 52 in Figs. 1 and 6, in the side of the throat portion of the hopper 44, because some of the larger drills may be of such a length that when they are arrested in the portal 30, by the magnets 29, a substantial part of their length may be projecting upwards from the upper opening in the portal 30. The opening 52 permits their passage through the side wall of the throat portion of 44, when the device is actuated, and the carriage draws the drill along the aperture 32.

I have found that if the hopper 44 be constructed according to the pattern of a conventional funnel, that is to say having a throat portion that is tapered in both senses, some of the very smallest drills which the drill sorter may be designed to accommodate, may occasionally emerge through the opening 52 instead of entering the portal 30. I have found that if the lateral dimension of the throat of 44 be made only slightly greater than the diameter of the largest drill for which the device is designed, this undesired occurrence may be precluded.

As has alrady been described, the channel shaped member 19 is permanently secured to the under sides of the flanges 50 and 51 by the studs 63, and the gauge-plate 31 is held against the upper surfaces of 50 and 51 by the springs 71, so that the minimum dimension of the aperture 32 at the right hand extremity thereof is equal to that of the thickness of the material from which the base-member 5 is formed.

It is convenient if this thickness may be a few thousandths of an inch greater than the diameter of the smallest drill to be used in the drill sorter. Thus, this smallest drill, only, will be carried by the magnets 29 of the carriage 24, through the fuel length of the aperture 32 and will come to rest at the edge of the right hand lateral flange 51. Drills of greater diameter will be arrested at points further to the left. Accordingly, though the left hand flange 50 may be straight throughout its length, the right hand flange 51 is provided with a stepped conformation as shown in Figs. 2 and 5 at 35. The lateral dimension of this step may be approximately equal to one half of the width of the slots in the rack 8 formed by the septa 11. This causes the smallest drill to be stopped at a point such that it tends to drop down the center of the last slot towards the right of the rack 8, instead of at the right hand edge of the latter.

Should it be desired to provide a drill sorter for accommodation of a series of drills of which the smallest one has a diameter greater than the thickness of which it is convenient to fabricate the base member 5, suitable shims may be included between the flanges 50, 51 and the gauge-plate 31. In this way a single conformation of the recess formed in 31 may be employed with different ranges of drill diameters.

Referring once more to Fig. 3 it is to be noted that the upper edge of the rack 8 is folded at 9 so as to form a slight recess and at the same time to provide a curved instead of a sheared edge to be encountered by the drill when it slides down from the aperture 32 into the slot in the rack 8 between adjacent septa 11. The recess at 9 also facilitates the cleaning of the aperture 32 when necessary.

The rack 8 is further folded below the lower extremities of the septa 11 so as to form another recess 10, and is then formed into an upstanding portion as shown in Figs. 1 and 3 at 12. The upper surface of 12 may carry suitable indicia as shown at 13 to designate the sizes of drills corresponding to the respective slots formed by the septa 11. There is shown, in Fig. 3, at D, a drill at rest in one of these slots so as to show the manner in which the upstanding portion 12 acts as a stop for the drill when it has entered the slot.

The rack 8 is secured to the under surfaces of the lateral flanges 50 and 51, the edges of which are notched at 45 to clear the upstanding portion 12. By securing the rack 8 to the under surfaces of the flanges 50 and 51, the upper surfaces of the slots between the septa 11, into which the drills are required readily to slide by gravitational action, are automatically caused to be, and to remain, in perfect alignment with the upper plane surface of the member 19 from which the drills pass to the rack 8; this is because the upper surface of 19, likewise, is in registered relation with the under surfaces of 50 and 51.

I show, in Fig. 6 the method of manually dispensing or withdrawing the drills from the rack 8 when they are required for use. The drill being at rest in the position shown at D in Fig. 3, the shank of the desired drill is depressed, as shown at B, in Fig. 6, by means of the finger most convenient, other than the index finger. This pushes the shank of the drill down into the recess 10 causing the body of the drill to emerge from the slot, as shown at A, in which position it may readily be grasped between the thumb and index finger.

Referring again to Fig. 4, the operation of my invention, when its action is initiated manually, has already been described. However, I show also in Fig. 4 the circuitry and arrangements for causing the drill sorter to be set in motion automatically when a drill is dropped into the hopper, substantially as already set forth in my above-identified co-pending application. Thus in Fig. 4 the transformer 53, the current-limiting resistance 57 and the relay 58 having contacts 59, perform the same functions, and are identified by the same reference numerals as in the prior application. I show also in Fig. 4 the conductor 48 which establishes electrical connection through the screw 47 with the hopper 44 whereby, as explained in my co-pending application, the relay 58 is operated when the drill completes the circuit from the hopper 44 to the member 19.

As seen in Fig. 4 the contacts 59 of the relay 58 are connected in parallel with the push-button 60; that is to say, likewise in parallel with the circuit-opening limit-switch 42. The self-starting arrangements disclosed and described in my co-pending application may be used in lieu of the manual starting switch 60 if desired. However, it is an added convenience to include the switch 60 as well as the automatic starting circuit, since it may occasionally happen, as for example when drilling plastics, that a small particle of insulating powder may adhere to a drill and prevent completion of the automatic starting continuity. In such an event the drill may be agitated by hand, or the circuit between the hopper 44 and the body of the drill sorter completed by applying another drill, a metal tool or the like at any convenient place so as momentarily to "ground" the hopper 44. The manual starting switch, if present, serves the same purpose more conveniently. I have accordingly shown in Fig. 4 both the manual and the automatic starting arrangements.

It will be apparent to those skilled in the art that a major portion of the structure disclosed in both my co-pending case and in my present application is common to both modes of operation. That is to say, this common structure is usable with either the stepped, rigid, type of gauge aperture, or with the smoothly tapered, separable aperture of my present application. It is therefore evident that a basic sub-assembly may be used to provide a drill sorter operating according to either of these two systems by combining therewith the additional material pertaining to the type of gauging pricinple which it is desired to employ.

To illustrate the extent to which the two alternative methods are interchangeable I have shown in Fig. 4, two connection points 76 and 77 to which leads 66 and 67 are connected for the purpose of energizing the two electromagnets 64, when the circuit-closing limit-switch 41 is actuated by the crank arm 36. I show, in Fig. 4A the very similar manner in which the agitating device of my co-pending application, identified in Fig. 4 by the reference numeral 64a, is connected if it be desired to use the basic structure of the drill sorter with a rigid, stepped aperture, instead of the electromagnetically separable aperture to which the complete diagram of connections shown in Fig. 4 pertains. It will be noted that all of the connections and arrangements shown in Fig. 4, other than the structure energized from the connection points 76 and 77, represent material common to both modes of operation.

I have found that the operation of my invention may in some cases be improved by the inclusion, in the circuits energized from 76 and 77, of unilaterally conducting devices such as contact rectifiers; though the application of such elements is slightly different according to which of the two alternative gauging systems is employed.

Figure 4A:
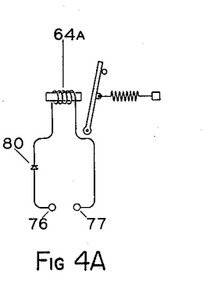
Fig. 4A is a circuit diagram of a modification of a portion of the electrical connections shown in Fig. 4.

In practising my invention according to my prior application Serial Number 551,393, in which the agitating device is employed, I have found that the rectifying device used should preferably be of the half-wave type, as shown at 80 in Fig. 4A. This produces a series of discrete magnetic impulses at one half of the frequency which would result from the use of a full-wave rectifier. The mass of the moving element of the agitating device responds with greater compliance to this form of excitation and the amplitude of its vibration is thereby augmented.

On the other hand, in the case of the variant arrangement disclosed in my present application no vibratory effect is aimed at; rather, it is desired to secure a promptly responsive lift and release of the gauge-plate 31. It is well known that D.-C. electromagnets are more efficient than those operating from an A.-C. soure. Accordingly I have found it advantageous to energize the two electromagnets 64 through a full-wave rectifier as shown at 81 in Fig. 4. However, the invention is entirely operable with A.-C. excited electromagnets in cases where this may be preferred.

While my present application discloses a type of drill sorter in which the gauge-plate 31 is shown as having a smooth taper, instead of a series of finite steps, it will be obvious to those skilled in the art that I may employ any combination of the principles and features disclosed and described in both my present and my co-pending applications, conformable with the requirements of the desired utilization of the device, without departing from the spirit of these inventions. For example, there are circumstances in which the use of a stepped gauge of the type disclosed in my co-pending application, in conjunction with the electromagnetic separation principle of my present application, possesses definite utility.

Thus, where a drill sorter is intended to be used with a specified series or denomination of drills, as in a set graduated in sixty-fourths of an inch, a smoothly tapered gauge-plate such as is disclosed in the present application, may appropriately and effectively be used. The co-relation of the taper of the gauge-plate 31 and the positions of the septa 11 may be so ordered that each drill is stopped at the proper position and dropped into its designated slot. The stepped gauge-plate of my co-pending application is likewise equally effective. Manufacturing and production considerations may favor the use of a smooth taper if it should be desired to provide for a p'urality of sets of drills embracing comparable ranges of diameters but in different series of denominations. In such circumstances a single type of tapered gauge-plate 31 may be used with different sets of drills by providing different types of the rack 8 in which the septa 11 are positioned conformably with the different drill sets.

On the other hand if it may be desired to sort a batch of drills of differing or unknown denominations, or to sort other cylindrical objects of random diameter, into groups such that each partition in the rack 8 is to embrace a predetermined range of diameters, it is possible that, with a continuously tapered gauge-plate, a drill or object may have a diameter such as to cause its release from the aperture at a point on the rack 8 at which one of the septa 11 is positioned. This type of use is one for which the combination of the stepped gauge-plate recess of my prior application, in combination with the electromagnetic separation of my present application, is clearly preferable. Where a stepped gauge aperture is used, the drills will be stopped at one or other of the steps in the aperture; that is to say in line with one of the slots formed by the septa 11 and in no case in line with one of the latter.

However, according to the operation of my prior system having the rigid stepped aperture, certain drills of a denomination foreign to that for which the steps in the aperture are designed, as also certain random diameters, will be arrested at one or other of the steps but will, due to their diameter being only greater than that which the step permits passage by a very small margin, become wedged at this position to an extent such as to present difficulty in their release by the impact or vibrator means of my prior application. A like situation occurs in the case of bent or badly damaged drills.

However, the use of the electromagnetic separation of my present application prevents stoppages of any kind resulting from the above causes and provides for a definite drop under all circumstances.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. Apparatus for sorting elongated objects, comprising a storage rack having a plurality of side-by-side upstanding channels for receiving the objects sorted, gauging means comprising a pair of members including two elongated opposed surfaces parallel in the transverse sense and convergent in the longitudinal sense defining a gauging recess therebetween, means for releasably constraining contiguity between other opposing surfaces of said members, said gauging means being disposed above said rack with the transverse direction of the lower surface of said gauging recess alined with said upstanding channels, means for receiving an object to be sorted at the divergent end of said gauging recess, means for propelling said object toward the convergent end of the gauging recess, whereby said object is moved to a position whereat said object is in contact with both of said convergent surfaces simultaneously and is thereby held in alinement with one of said channels determined by the size of said object, and means for separating said members thereby releasing said object so that it enters said channel.

2. Apparatus as in claim 1, in which one of said members is mounted in longitudinally stationary relation to said rack.

3. Apparatus as in claim 1, in which said channels of the storage rack are parallel and co-planar, with the plane of said channels inclined at an oblique angle.

4. Apparatus as in claim 3, in which said angle is approximately forty-five degrees.

5. Apparatus as in claim 1, in which the two opposed convergent surfaces consist of two plane surfaces.

6. Apparatus as in claim 1, in which the two opposed convergent surfaces consist of one smooth flat surface and one stepped surface.

7. Apparatus as in claim 1, in which the object to be sorted is cylindrical, and in which said object is caused by said propelling means to roll along one of said opposed convergent surfaces.

8. A device for sorting elongated cylindrical objects by diameter, comprising a base, a channel-shaped member mounted on said base at a point near the top thereof, a rack having spaced object receiving areas positioned at a lower point on said base, a gauge-plate mounted anterior said member, said gauge-plate having a tapered recess formed therein adjacent said member, said tapered recess progressively diminishing in one direction, a magnetic carrier slidably mounted posterior said member, means for moving said carrier laterally to magnetically carry the object being sorted from the large end of said recess towards the small end thereof, whereby said object being sorted will engage said recessed gauge-plate and said channel-shaped member and in alignment with a predetermined rack storage position, and electromagnetic means for releasing said object from said engagement so that it falls by gravity into a predetermined one of said spaced object receiving areas, said base consisting of a rectangular sheet of material having four successive parallel right angle bends in like sense so that it has the form of a box closed at the bottom and on the two sides the top consisting of partial upper portions at the two sides with the center portion open, said channel-shaped member and said rack being affixed to the under surfaces of said two side portions and said gauge-plate being mounted upon the upper surface of said side portions.

9. A device for sorting elongated cylindrical objects by diameter, comprising a base, a channel-shaped member mounted on said base at a point near the top thereof, a rack having spaced object receiving areas positioned at a lower point on said base, a gauge-plate mounted anterior said member, said gauge-plate having a tapered recess formed therein adjacent said member, said tapered recess progressively diminishing in one direction, a magnetic carrier slidably mounted posterior said member, means for moving said carrier laterally to magnetically carry the object being sorted from the large end of said recess towards the small end thereof, whereby said object being sorted will engage said recessed gauge-plate and said channel-shaped member and in alignment with a predetermined rack storage position, and electromagnetic means for releasing said object from said engagement so that it falls by gravity into a predetermined one of said spaced object receiving areas, said rack consisting of a rectangular sheet of material having seven consecutive parallel right angle bends, said first, second, fifth and sixth bends being in like sense, and said third, fourth and seventh bend being in opposite sense, the distance between said fifth and sixth bends being commensurate with the maximum length of said objects and substantially greater than the distance between any other two adjacent bends, and having a plurality of upstanding septa affixed to the surface between said fifth and sixth bends at right angles thereto so as to form said object receiving areas, the surface between said second and third bends comprising a bottom stop for retaining said objects in said areas, and the surface between said third and fourth bends comprising a relatively shallow cavity such that when the lower portion of one of said cylindrical objects is depressed therein the upper portion thereof is caused to emerge from said receiving areas so that the object may be manually grasped for removal from said rack.

10. A device for sorting elongated cylindrical objects by diameter, comprising a base, a channel-shaped member mounted on said base at a point near the top thereof, a rack having spaced object receiving areas positioned at a lower point on said base, a gauge-plate mounted anterior said member, said gauge-plate having a tapered recess formed therein adjacent said member, said tapered recess progressively diminishing in one direction, a magnetic carrier slidably mounted posterior said member, means for moving said carrier laterally to magnetically carry the object being sorted from the large end of said recess towards the small end thereof, whereby said object being sorted will engage said recessed gauge-plate and said channel-shaped member and in alignment with a predetermined rack storage position, and electromagnetic means for releasing said object from said engagement so that it falls by gravity into a predetermined one of said spaced object receiving areas, said channel-shaped member having within its hollow lower surface a longitudinal supporting track of retentive cross-section for supporting and guiding said magnetic carrier.

11. Apparatus as in claim 1, in which said means for propelling the object comprises a magnet disposed adjacent to said gauging means external to the gauging recess, and means for moving said magnet lengthwise of said recess.

12. Apparatus as in claim 1, in which said separating means comprises means actuated by said propelling means for causing a transient increase in the distance between said convergent surfaces.

13. Apparatus as in claim 1, in which said separating means includes an electro-magnet momentarily energized when said propelling means approaches the extremity of its travel toward the convergent end of said recess.

14. Apparatus as in claim 1, additionally comprising a hopper for receiving the object to be sorted when delivered in a random attitude and from the front thereof, said hopper having side walls consisting of an upper portion forming two substantially plane convergent surfaces for alining said object with its axis at right angles to the longitudinal dimension of said gauging recess and a lower portion forming two substantially plane parallel surfaces having curved convergent front and back walls shaped to turn the object through a substantial angle relative to its axis so as to feed it lengthwise into said receiving means at the divergent end of the gauging recess in alinement with the transverse sense of one of said opposed surfaces.

15. Apparatus as in claim 1, additionally comprising means for controlling said object propelling means, said controlling means including an electric circuit in which the object to be sorted forms a conducting element.

16. Apparatus as in claim 11, in which the distance between the magnet and one of said opposed surfaces increases with the movement of said magnet toward the convergent end of said recess.

References Cited in the file of this patent

UNITED STATES PATENTS 2,091,815     Hommel              Aug. 31, 1937